Sept. 18, 1956     B. W. BADENOCH     2,763,242

POWER TRANSMISSION

Filed June 12, 1953     2 Sheets—Sheet 1

INVENTOR.
BENJAMIN W. BADENOCH
BY
*Ralph L. Tweedale*
ATTORNEY

Sept. 18, 1956　　　B. W. BADENOCH　　　2,763,242
POWER TRANSMISSION

Filed June 12, 1953　　　　　　　　　　2 Sheets-Sheet 2

INVENTOR.
BENJAMIN W. BADENOCH
BY
*Ralph L. Tweedie*
ATTORNEY.

United States Patent Office 2,763,242
Patented Sept. 18, 1956

2,763,242

POWER TRANSMISSION

Benjamin W. Badenoch, Los Angeles, Calif., assignor to Vickers Incorporated, Detroit, Mich., a corporation of Michigan Application June 12, 1953, Serial No. 361,178

9 Claims. (Cl. 121—39)

This invention relates to power transmissions, and is particularly applicable to those of the type comprising two or more fluid pressure energy translating devices, one of which may function as a pump and another as a fluid motor.

The present invention is generally concerned with fluid motors of the fixed displacement type together with flow control means for regulating the speed wherein the flow control means comprises a throttle and a pressure compensating valve. In such type of flow control mechanism the pressure compensating valve is responsive to the flow across the throttle to maintain the pressure drop thereacross constant and thus the flow therethrough at a constant regulated rate.

Flow control mechanism of the type recited may be placed on the inlet or outlet side of the fluid motor to provide respectively systems of the meter-in or meter-out type and may be utilized in conjunction with a pressure relief valve or a pressure by-pass valve for maintaining constant pressure and for by-passing a quantity of fluid delivered from the pump in excess of the regulated motor speed requirements. In systems of the meter-in type the pressure compensating valve may be of the excess discharge type in which case the fluid delivery from the pump in excess of the motor speed requirements is by-passed by the pressure compensating valve itself rather than by a separate relief valve or by-pass valve. Flow control mechanism of the two types recited are disclosed in the patent to Vickers No. 2,272,684 and the patent to Vickers No. 2,102,865.

When flow control mechanism of this type has been utilized with multi-fixed displacement fluid motors of the multi-piston and cylinder type, it has been customary to place both the throttle and the pressure compensating valve in the supply line leading to the motor. This has been done to avoid excessive bearing loads on the motor. In motors of the axial piston type, the load forces generated by fluid pressure within the device may be divided into components acting both in an axial and radial direction and are carried by the drive shaft which are then transmitted to the drive shaft bearings and to the casing. When both the throttle and pressure compensating valve are placed at the outlet side of such a motor, all of the pistons are constantly under full load. With the present tendency in the art toward increasingly higher pressures, this naturally imposes greater and greater loads on the radial and thrust bearings of the device, and it has therefore been found impractical to place the flow regulation valving on the outlet side of such a motor.

Although placing the complete flow control mechanism on the inlet side of such motors has been a practical expedient, it has not been completely successful where extreme accuracy in motor speed is required. This objection also applies to other types of fluid motors. This is due to the fact that although the pressure compensating valve and throttle cooperate to apparently maintain a constant regulated flow to the motor, the motor speed will vary in spite of this flow regulation because of internal leakage in the motor. In other words, in the conventional meter-in system, the complete displacement of the pump is measured, regulated, and the excess over motor speed requirements subtracted or by-passed before it reaches the motor in order to maintain the motor speed constant. As there is an additional unmeasured amount subtracted because of leakage inside the motor and this subtracted amount will vary according to variable conditions such as changes in pressure, the displacement of the motor which is a true measure of its speed will vary in spite of constant flow control regulations. Leakage will also vary because of wear and also because no two motors will be manufactured exactly alike.

It has also been conventional to provide separate flow control valving requiring separate housings for connection in the hydraulic circuit to control the speed of fixed displacement motors. In many cases, the valving is mounted in one housing comprising a panel of specially constructed form. This is objectionable where space and weight requirements are important, such as in aircraft use.

It is therefore an object of this invention to provide a fluid motor with an improved flow regulating valve system for controlling the speed of the motor.

It is another object of this invention to provide in a fluid motor an improved flow regulating system which may be conveniently mounted completely within the motor.

It is still another object of this invention to provide a fluid motor having improved flow regulating mechanism for regulating the speed thereof mounted completely within the motor and which not only obviates the difficulties recited in prior systems, but which is also extremely accurate.

It is a further object of this invention to provide a casing head which may be conveniently mounted on many conventional types of fluid motors and which has mounted therein an improved flow regulating system for more accurately controlling the speed of the motor.

It is also an object of this invention to provide a fluid motor having speed control mechanism mounted completely therein which is compact, rugged, economical and efficient over a long and useful life.

Further objects and advantages of the present invention will be apparent from the following description, reference being had to the accompanying drawings wherein a preferred form of the present invention is clearly shown.

Figure 1:
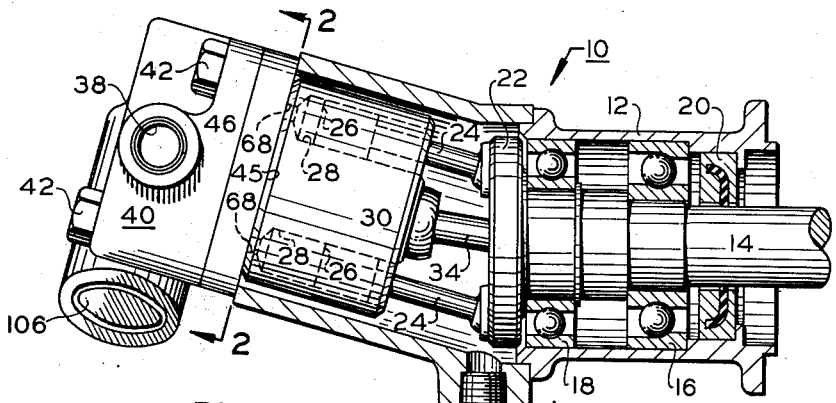
Figure 1 is a longitudinal sectional view of a fluid motor embodying a preferred form of the present invention.

Referring now to Figure 1, there is shown a fluid motor 10 of the axial piston type, an example of the basic structure of which is illustrated in the patent to Hans Thoma, No. 1,931,969, although it should be understood that the features of the invention to be described are equally adapted for use with other types of fixed displacement fluid motors. The motor 10 comprises a casing 12 in which a shaft 14 is journalled on anti-thrust and radial bearings 16 and 18 respectively, the usual oil seal 20 being provided around the projecting end of the drive shaft 14.

Figure 4:
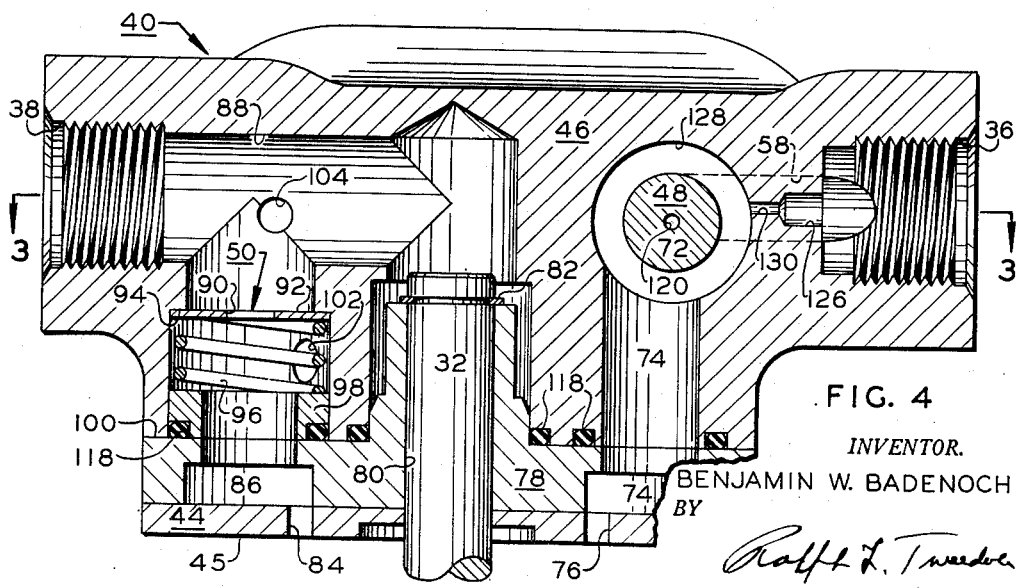
Figure 4 is a sectional view of a preferred form of the present invention taken on line 4—4 of Figure 3.

The shaft 14 has a flange 22 to which are pivotally connected a plurality of ball ended connecting rods 24 carrying pistons 26 connected to their opposite ends by means of ball joints. The pistons 26 are adapted to reciprocate in cylinders 28 formed in a cylinder barrel 30 which is mounted on a shaft 32 shown in Figure 4. A Cardan shaft 34 forms a driving connection between the cylinder barrel 30 and the shaft 14.

The motor 10 is provided with an inlet supply port 36 and an outlet or discharge port 38 in a casing head indicated generally by the numeral 40 which is suitably fastened by bolts 42 to the casing 12. The casing head 40 may be constructed in three sections, one section of which comprises a valve plate 44 which is brazed to a two-section valve block 46 to form the unitary motor head 40. The valve plate 44 is provided with adjacently located arcuate inlet and outlet porting extending completely therethrough, the porting on the face of the valve plate indicated by the numeral 45 being adapted to cooperate with the cylinders 28 and pistons 26 of the cylinder barrel 30 in timed relationship in the conventional manner. The valve block portion 46 has mounted therein flow regulating valve mechanism comprising a pressure compensating valve and a restriction or throttle respectively indicated generally by the numerals 48 and 50.

Figure 3:
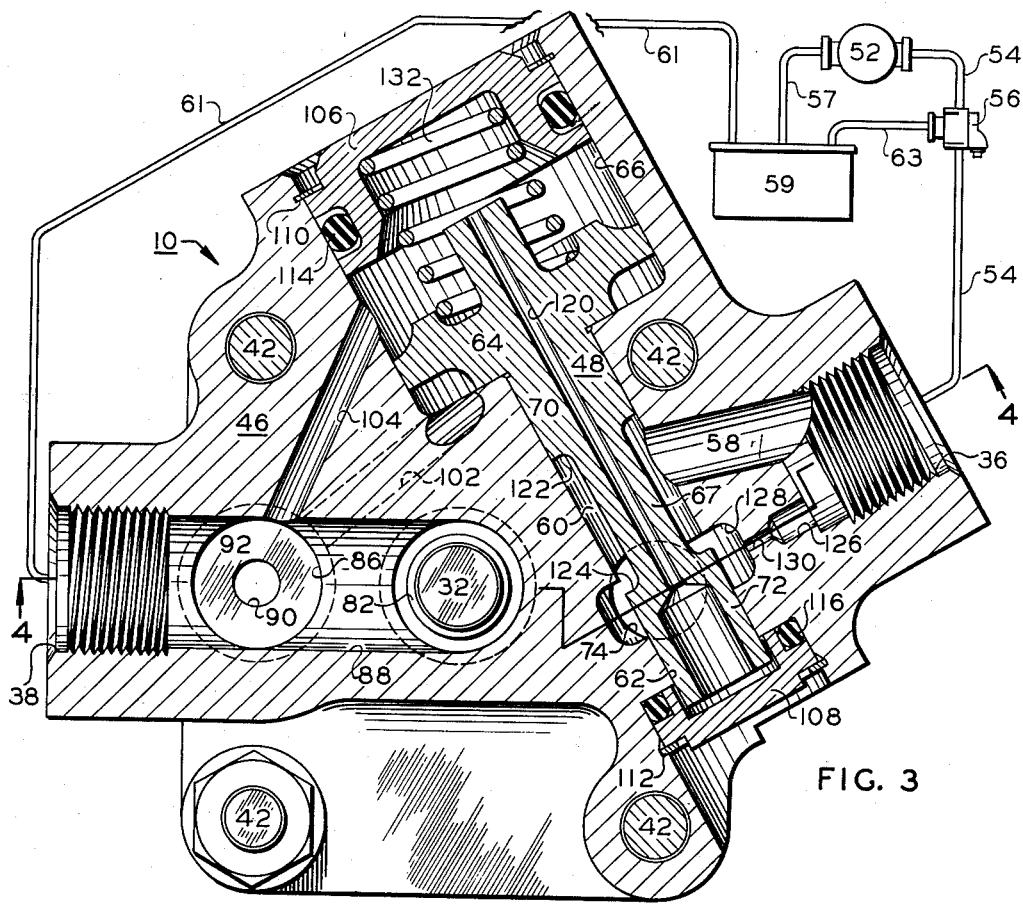
Figure 3 is a view of a hydraulic circuit incorporating a preferred form of the present invention and showing in section a view of the fluid motor device taken on line 3—3 of Figure 4.

As shown in Figure 3, the motor device 10 is connected in a hydraulic circuit wherein high pressure fluid delivered from a pump 52 is conducted by a conduit 54, in which is mounted a conventional relief valve 56, to the inlet supply port 36 of the motor 10. The pump 52 is connected by a fluid supply conduit 57 to a reservoir 59, and the outlet port 38 of the motor 10 is connected by a conduit 61 to said reservoir. The displacement of the pump 52 is adapted to be in excess of motor speed requirements, and the excess of said requirement is by-passed by the relief valve 56 to the reservoir 59 by means of a conduit 63.

Fluid under pressure determined by the setting of relief valve 56, which is adapted to be slightly in excess of motor load requirements, and which is conducted to the inlet port 36 of motor 10, is directed by an inlet passage 58 connected to the motor inlet port 36 to an inlet chamber 60 of the compensating valve 48 which is formed by mounting the compensating valve 48 in a stepped bore 62 in the valve block 46.

Figure 2:
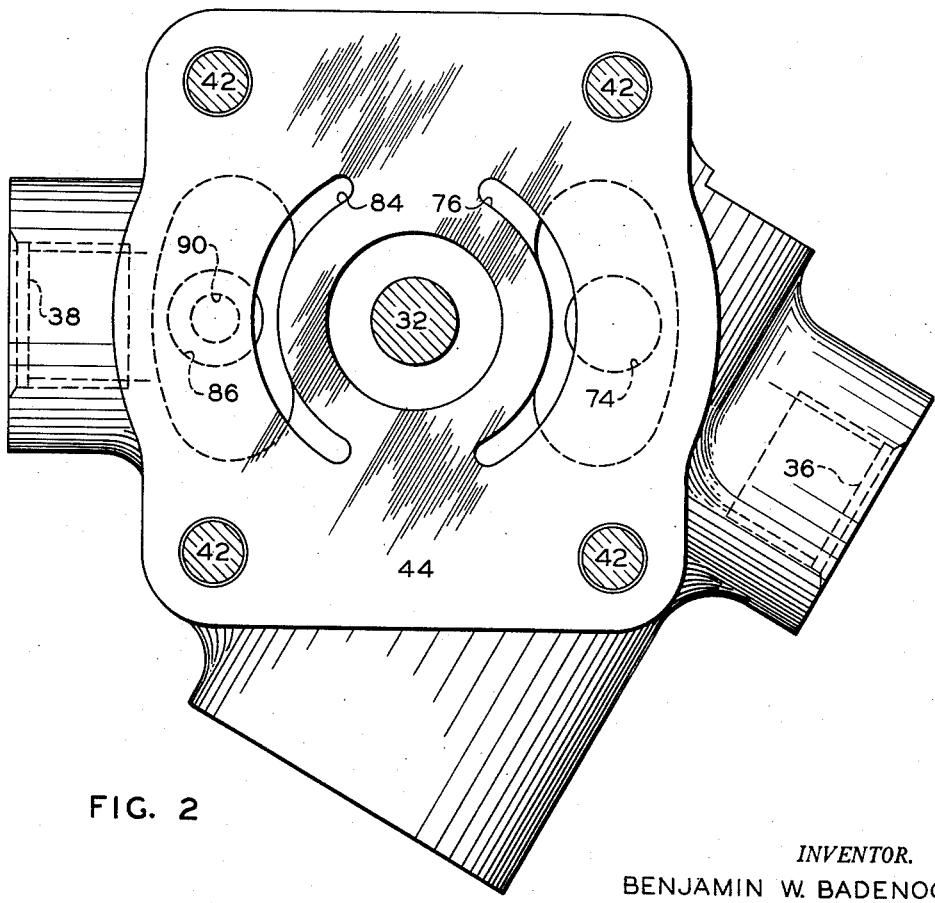
Figure 2 is a view of a valve plate forming part of the motor of Figure 1 and taken on line 2—2 of Figure 1.

The pressure compensating valve 48 is of a type well known in the art and comprises a regulating or control piston 64 shiftably mounted in an enlarged portion 66 of the bore 62 and a stem 67 thereof shiftably mounted in the smaller portion of the bore 62 and having two lands 70 and 72. The land 72 performs as a throttle by admitting fluid in desired quantities from the inlet chamber 60 to a continuing inlet passage 74 intersecting the inlet chamber and leading to an arcuate inlet port 76 of the valve plate which extends therethrough, said porting being shown more clearly in Figures 2 and 4. An enlarged portion of the passage 74 is formed in a separate section 78 of the valve block 46. The valve plate 44 may be brazed to the flat surface of the section 78, said section having a mounting bore 80 for the cylinder barrel shaft 32 which is maintained therein by a snap ring 82.

The valve plate 44 is constructed with a duplicate, arcuate outlet port 84 which leads to and registers with a passage 86 formed in the section 78 adjacent to the inlet passage and extending into the valve block 46 to a cross passage 88 leading directly to the outlet port 38. The throttle indicated generally by the numeral 50 comprises a restriction 90 formed in a disc washer 92 mounted in the passage 86 of the valve block 46. The disc 92 is maintained against a shoulder 94 of the casing head or valve block 46 by a spring 96, the opposite end of the spring abutting a retainer 98 which in turn is maintained in position against a flat face 100 of the section 78.

The compensating valve 48 is adapted to be responsive to the flow across the throttle 90 to maintain a substantially constant pressure drop thereacross and for the performance of this operation, two angular cross passages connect the passage 86 to the enlarged portion 66 of the bore 62 in which the piston 64 of the compensating valve 48 is mounted. One passage indicated by the numeral 102 connects the outlet passage 86 ahead of the throttle 90 to the enlarged portion of the bore 66 and to the underside of the piston 64, while the second passage indicated by the numeral 104 connects the passage 86 beyond throttle 90 to the bore 66 on the opposite side of the piston 64.

The upper and lower ends of the bore 62 are closed by plugs 106 and 108 maintained in place by snap rings 110 and 112, said plugs being respectively provided with sealing rings 114 and 116. Sealing between the two sections of the valve block 46 is provided by means of three O-rings, all of which are indicated by the numeral 118.

The chamber space above the piston 64 and the chamber space at the bottom of land 72 at the lower end of bore 62 are connected to each other to handle fluid displacement at opposite ends of the compensating valve 48 by means of a passage 120 extending completely through the compensating valve.

Although the compensating valve lands 70 and 72 have opposed surfaces 122 and 124 the areas of which are balanced as to inlet flow, under high velocity flow conditions the forces thereon become unbalanced, and there is a tendency for a hunting effect to be produced by the Bernoulli forces created. Normally, in conventional constructions, as the valve shifts towards the closed position, an increased pressure drop is created across the metering land which causes the valve to become pressure unbalanced and tending to close the same more fully. In order to alleviate this unbalanced condition, an auxiliary passage 126 has been provided to supplement the pressure inlet passage 58 and which is also connected to the pressure inlet port 36. The passage 126 leads directly to an enlarged portion 128 of the bore 62 which is always in communication with passage 74, the latter of which leads to the arcuate inlet porting 76 of the valve plate 44. A restriction 130 is placed in the passage 126 for the purpose of counteracting the previously recited undesirable Bernoulli forces. Normally, because of the restriction 130, the major displacement from the pump 52 is directed through the passage 58. However, when the inlet flow increases, the Bernoulli forces tend to be the greatest. This is due to the increased pressure drop across the land 72, which moves toward the closed position. The auxiliary control passage becomes effective when the pressure drop tends to be greatest, thus alleviating the unfavorable conditions recited. This is a safety feature also because if the compensating valve for any reason would close completely, the passage 126 would serve as a by-pass passage around the metering portion 124 of the compensating valve 48.

The pressure drop across the throttle 90 is determined by the biasing force of a spring 132 which urges the compensating valve 48 to the fully opened position shown. The spring 132 preferably exerts a light load on the piston 64 so that the pressure drop maintained across the throttle 90 may be maintained in a manner to exert a load at the outlet side of the motor which is of slight or of no consequence in relation to bearing loads.

In operation, the displacement of pump 52 is directed by conduit 54 to the inlet port 36 of the motor 10. From inlet port 36 fluid is conducted by passage 58 to inlet chamber 60 and to passage 74 whence by passage 126 it is conducted to the enlarged portion 128 and passage 74. Pressure fluid then enters by arcuate valve plate port 76 the cylinder ports 68 of a portion of the cylinders 28 to actuate the pistons 26 therein on their power stroke to rotate the cylinder barrel 30 and thus the drive shaft 14. Fluid being displaced from the remainder of the cylinders will be directed to outlet port 38 by means of valve plate port 84, passage 86, throttle 90 and passage 88. From outlet port 38, the displacement of the motor is directed to the reservoir 59 by means of conduit 61.

The compensating valve 48 modulates between the fully open and fully closed position to maintain the pressure drop across the throttle 90 substantially constant as determined by the load bias of the spring 132. The complete displacement of the motor must pass through the throttle 90, and pressure ahead of the throtle 90 in passage 86 is transmitted to the under side of piston 64 by angular cross passage 102. Pressure beyond the throttle 90 in passage 86 is transmitted to the upper side of piston 64 by means of angular passage 104. Any tendency for an increased or decreased pressure drop across the throttle 90 is transmitted directly to the control piston 64. When the pressure drop tends to increase, the increase in pressure ahead of the throttle is transmitted to the under side of piston 64 to operate the compensating valve more fully towards the closed position to admit less fluid. When the pressure drop tends to decrease, the drop in pressure ahead of the throttle is reflected at the under side of piston 64 to operate the same more fully towards the open position to admit more fluid. The position of the land 72 and metering portion 124 thereof relative to the passage 74 will thus open or close said passage more fully to inlet flow. Any excess of pump displacement over constant motor speed requirements is exhausted over the relief valve 56 to reservoir 59.

It should be noted that the compensating valve regulates flow at the inlet side of the motor device 10, but that the measurement of this regulation is at the outlet side of the motor after leakage through the rotary parts has taken place. This is accomplished by actuating the compensating valve to maintain the pressure drop across the throttle 90 substantially constant in response to flow across the throttle in passage 86 in the outlet side of the motor device. The flow regulating system thus provides more accurate speed control of the motor than motor devices regulated by flow regulating mechanism placed completely on the inlet side of the device. In addition, the loads on the radial and thrust bearings are substantially the same as if the entire mechanism had been placed on the inlet side of the device.

It should also be noted that as the inlet and outlet porting of the motor device are in the casing head or valve block portion thereof adjacent to each other that the flow regulating mechanism comprising the compensating valve and throttle may be conveniently mounted in said block in close proximity to the passages. Thus the compensating valve bore may be conveniently constructed between the inlet port and passages leading to the arcuate inlet port of the valve plate. The same advantageous constructional features also pertain to the passages connecting the outlet passage to the compensating valve bore to measure the pressure drop across the throttle, the latter of which may be economically constructed and conveniently mounted in the casing head.

The features of the invention are applicable for fluid motors of the multi-piston type having a casing head with adjacent inlet and outlet passages therein and are also applicable for other types of fluid motors. All that is necessary is to construct a compensating valve bore intersecting the inlet passage and with the outlet passage being adjacent thereto, construct two short passages leading from the outlet passage to the bore. Conventional flow regulating mechanism comprising a pressure compensating valve and a fixed throttle are mounted in the bore and outlet passage respectively to complete the structure. The invention thus eliminates the providing of a separate flow regulating valve comprising a body for housing both a pressure compensating valve and throttle or separate bodies for individually housing the mechanism. It also overcomes the deficiencies of transmission systems wherein the flow regulating mechanism is placed completely on the inlet or outlet sides of the motor.

While the form of embodiment of the invention as herein disclosed constitutes a preferred form, it is to be understood that other forms might be adopted, all coming within the scope of the claims which follow.

What is claimed is as follows:

1. A self-regulated fluid motor operable at controlled speeds independent of line pressure variations comprising a body having a drive shaft, mechanism associated with the shaft for converting fluid pressure into drive shaft torque, and inlet and outlet passages respectively leading to and from the mechanism, a first throttle in the outlet passage, a variable pressure responsive throttle in the inlet passage, said variable throttle being responsive to the pressures ahead of and beyond the first throttle for controlling flow through the inlet passage for regulating the pressure drop across the first throttle and thereby accurately controlling the speed of said motor independently of internal leakage of the mechanism, an auxiliary passage connecting the inlet passage to the mechanism around the variable throttle, and a third throttle in the auxiliary passage.

2. A self-regulated fluid motor operable at controlled speeds independent of line pressure variations comprising a body having a drive shaft, mechanism associated with the shaft for converting fluid pressure into drive shaft torque, and inlet and outlet passages respectively leading to and from the mechanism, flow regulating mechanism for controlling the speed of the motor mounted completely within the body and comprising a throttle in the outlet passage, a compensating valve in the inlet passage, operating means for the compensating valve responsive to the pressures across the throttle in the outlet passage for causing the compensating valve to regulate flow through the inlet passage to control the pressure drop across the throttle and to thereby accurately control the speed of the motor independently of internal leakage of the mechanism, means forming an inlet by-pass passage around the compensating valve, and a throttle in said by-pass passage.

3. A self-regulated fluid motor operable at controlled speeds independent of line pressure variations comprising in combination a body having a drive shaft and associated therewith mechanism for converting fluid pressure into drive shaft torque, adjacently located fluid inlet and outlet passages leading respectively to and from the mechanism, a throttle mounted in the outlet passage, a bore intersecting the inlet passage, a compensating valve shiftably mounted in the bore for controlling fluid supply to the mechanism, operating means for the compensating valve also mounted in the bore comprising a resiliently biased control piston, means forming two passages connecting the outlet passage ahead of and beyond the throttle to the bore on opposite sides of the control piston, said operating means actuating the compensating valve in response to the pressure drop across the throttle and thereby accurately controlling the speed of said motor independently of internal leakage of the mechanism, an auxiliary passage connected at opposite ends to the inlet passage around the compensating valve, and a throttle in the auxiliary passage.

4. A self-regulated rotary fluid motor operable at controlled speeds independent of line pressure variations comprising a stationary body member having a rotatable drive shaft, propelling mechanism for converting fluid pressure into drive shaft torque including a rotary cylinder barrel employing axially disposed cylinders and pistons reciprocably mounted therein, and inlet and outlet passages respectively leading to and from the mechanism and connected to the cylinders in timed relationship as the cylinder barrel rotates, a throttle in the outlet passage, a variable throttle in the inlet passage responsive to the pressures ahead of and beyond the first throttle to control flow through the inlet passage for regulating the pressure drop across the first throttle and to thereby control the speed of the motor independently of internal leakage of the mechanism, and resilient biasing means for the variable throttle determining the pressure drop across the first throttle, the force of the resilient biasing means being small to prevent high pressure in the outlet passage ahead of the first throttle.

5. A self-regulated rotary fluid motor operable at controlled speeds independent of line pressure variations comprising a stationary body member having a rotatable drive shaft, propelling mechanism for converting fluid pressure into drive shaft torque including a rotary cylinder barrel employing axially disposed cylinders and pistons reciprocably mounted therein, and inlet and outlet passages respectively leading to and from the mechanism and connected to the cylinders in timed relationship as the cylinder barrel rotates, flow regulating mechanism for controlling the speed of the motor mounted completely within the body and comprising a throttle in the outlet passage, a compensating valve in the inlet passage, operating means for the compensating valve responsive to the pressures ahead of and beyond the throttle to cause the compensating valve to regulate flow through the inlet to regulate the pressure drop across the throttle and to thereby accurately control the speed of the motor independently of internal leakage of the mechanism, and resilient biasing means for the compensating valve determining the pressure drop across the throttle the force of which is small to prevent high pressure in the outlet passage ahead of the throttle.

6. A self-regulated rotary fluid motor operable at controlled speeds independent of line pressure variations comprising a body having a rotatable drive shaft, propelling mechanism associated with the shaft for converting fluid pressure into drive shaft torque including a rotary cylinder barrel employing axially disposed cylinders and pistons reciprocably mounted therein, and adjacently located inlet and outlet passages respectively leading to and from the mechanism, a fixed throttle in the outlet passage, a variable throttle in the inlet passage, pressure responsive operating means associated with the variable throttle and hydraulically connected to the outlet passage ahead of and beyond the fixed throttle, said variable throttle controlling fluid supply to the mechanism in response to flow measurement across the fixed throttle for regulating the pressure drop across the fixed throttle and thereby accurately controlling the speed of the motor independently of leakage of the motor mechanism, and resilient biasing means for the operating means of the variable throttle for determining the pressure drop across the fixed throttle, the force of the resilient biasing means being small to prevent high pressure ahead of the fixed throttle in the outlet passage.

7. A self-regulated rotary fluid motor operable at controlled speeds independent of line pressure variations comprising a stationary body member having a rotatable drive shaft, propelling mechanism for converting fluid pressure into drive shaft torque including a rotary cylinder barrel employing axially disposed cylinders and pistons reciprocably mounted therein, and adjacently located inlet and outlet passages respectively leading to and from the mechanism and connected to the cylinders in timed relationship as the cylinder barrel rotates, a throttle mounted in the outlet passage, a bore intersecting the inlet passage, a compensating valve shiftably mounted in the bore for controlling fluid supply to the mechanism, operating means for the compensating valve also mounted in the bore comprising a control piston and resilient biasing means for the control piston, and means forming two passages connecting the outlet passage ahead of and beyond the throttle to the bore on opposite sides of the control piston, said operating means actuating the compensating valve in response to the pressure drop across the throttle and thereby accurately controlling the speed of said motor independently of internal leakage of the mechanism, the resilient biasing means determining the pressure drop across the throttle and the force of which is low to prevent high pressure in the outlet passage ahead of the throttle.

8. For use with a rotary fluid motor comprising a body having a rotatable drive shaft and propelled mechanism associated with the shaft for converting fluid pressure into drive shaft torque including a rotary cylinder barrel employing axially disposed cylinders and pistons reciprocably mounted therein, a head for the body having supply and inlet passages respectively adapted to lead to and from the mechanism, a first throttle mounted in the outlet passage, a variable throttle mounted in the supply passage, operating means for the variable throttle responsive to the pressures ahead of and beyond the first throttle for causing the variable throttle to control flow through the inlet passage to regulate the pressure drop across the first throttle and thereby accurately controlling the speed of the motor independently of internal leakage of the mechanism, and resilient means biasing the operating means of the variable throttle determining the pressure drop across the first throttle, the force of the biasing means being small to prevent high pressure in the outlet passage ahead of the first throttle.

9. A valve block mountable on the body of a rotary fluid motor having propelling mechanism mounted therein for converting fluid pressure into drive shaft torque including a rotary cylinder barrel employing axially disposed cylinders and pistons reciprocably mounted therein, said block having adjacently located fluid supply and outlet passages adapted to lead respectively to and from the mechanism, a fixed throttle mounted in the outlet passage, a bore intersecting the supply passage, a compensating valve mounted in the bore to control the supply passage, operating means for the compensating valve also mounted in the bore comprising a resiliently biased control piston, and means forming two passages leading from the outlet passage on opposite sides of the throttle to the bore on opposite sides of the control piston, said compensating valve controlling flow through the inlet passage for regulating the pressure drop across the throttle and thereby accurately controlling the speed of the motor independently of internal leakage of the mechanism and the resilient bias force on the control piston being small to prevent high pressure ahead of the throttle in the outlet passage.

References Cited in the file of this patent

UNITED STATES PATENTS

| | | |
|---|---|---|
| 1,800,929 | Craig | Apr. 14, 1931 |
| 1,905,132 | Bishop | Apr. 25, 1933 |
| 2,000,984 | Plato | May 14, 1935 |
| 2,190,812 | Wahlmark | Feb. 20, 1940 |

FOREIGN PATENTS

| | | |
|---|---|---|
| 232,349 | Great Britain | Apr. 23, 1925 |
| 470,099 | Great Britain | Aug. 3, 1937 |
| 270,652 | Switzerland | Dec. 1, 1950 |